United States Patent
Cheng et al.

(10) Patent No.: US 8,478,999 B2
(45) Date of Patent: Jul. 2, 2013

(54) CONGESTION MANAGEMENT OF SESSION NEGOTIATIONS IN NETWORK DEVICES

(75) Inventors: Yonghui Cheng, Santa Clara, CA (US); Choung-Yaw Shieh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 540 days.

(21) Appl. No.: 12/550,806

(22) Filed: Aug. 31, 2009

(65) Prior Publication Data
US 2009/0320122 A1  Dec. 24, 2009

Related U.S. Application Data

(62) Division of application No. 10/990,352, filed on Nov. 17, 2004, now Pat. No. 7,602,709.

(51) Int. Cl.
*H04L 29/06* (2006.01)
(52) U.S. Cl.
USPC .......................................................... 713/171
(58) Field of Classification Search
USPC .......................................................... 713/171
See application file for complete search history.

(56) References Cited

U.S. PATENT DOCUMENTS

| | | | |
|---|---|---|---|
| 6,671,259 B1 * | 12/2003 | He et al. ........................ | 370/238 |
| 6,789,203 B1 | 9/2004 | Belissent | |
| 6,839,767 B1 | 1/2005 | Davies et al. | |
| 6,904,529 B1 * | 6/2005 | Swander ........................ | 726/14 |
| 7,107,350 B2 | 9/2006 | Godwin et al. | |
| 7,376,743 B1 * | 5/2008 | Bazzinotti et al. ............. | 709/229 |
| 2004/0083385 A1 * | 4/2004 | Ahmed et al. ................. | 713/201 |
| 2005/0081211 A1 * | 4/2005 | Koga et al. .................... | 718/105 |
| 2005/0220097 A1 | 10/2005 | Swami et al. | |

OTHER PUBLICATIONS

Co-pending U.S. Appl. No. 10/990,352, filed Nov. 17, 2004; Yonghui Cheng et al., entitled "Congestion Management of Session Negotiations in Network Devices".

* cited by examiner

*Primary Examiner* — Jason Gee
(74) *Attorney, Agent, or Firm* — Harrity & Harrity, LLP

(57) ABSTRACT

A network device implements congestion management of sessions of a network protocol. In one implementation, an incoming request component receives session requests for a negotiation session between the network device and a second network device. A capacity pool stores a value relating to capacity of the network device to continue to efficiently process the session requests. New sessions are initiated when the value stored in the capacity pool is less than an estimate of the capacity of the network device at which the network device maximizes processor usage while minimizing session timeouts.

20 Claims, 6 Drawing Sheets

CONGESTION MANAGEMENT OF SESSION NEGOTIATIONS IN NETWORK DEVICES

RELATED APPLICATION

This application is a divisional of U.S. patent application Ser. No. 10/990,352, filed Nov. 17, 2004, which is incorporated herein by reference.

FIELD OF THE INVENTION

Principles of the invention relate generally to network device operation and, more particularly, to managing congestion in negotiation sessions between network devices.

DESCRIPTION OF RELATED ART

In an increasingly networked world, devices that enable the network are becoming pervasive. Two examples of such network devices are firewalls and routers. A firewall may generally be defined as a network gateway device that protects the resources of a private network from users associated with other networks. An enterprise with an intranet that allows its workers access to the Internet may install a firewall to prevent outsiders from accessing its own private data resources and for controlling what outside resources its own users can access. A router may generally be defined as a network device that determines the next network point to which network packets should be forwarded as the packets progress towards their final destination.

Network devices, such as firewalls and routers, may implement virtual private networks (VPNs). A VPN is a communication scheme in which data is securely transmitted between two network devices over a public network. The two network devices form a secure communication session in which data exchanged between the devices is transmitted in secure "tunnels." A tunnel is secure because data transmitted through the tunnel is encrypted so that only the sending and receiving network devices are able to intelligibly interpret the data. Although the two network devices may be physically connected via a public (non-secure) network, the network devices are connected with a level of security approaching that of a private network. Thus, the devices are said to be in a virtual private network.

A common VPN standard is based on the well known Internet Protocol Security (IPSec) standard, which is a security protocol that provides for authentication and encryption over IP networks. IPSec sessions may begin with the two network devices negotiating a shared secret key using the Internet Key Exchange (IKE) standard. IKE is a key negotiation protocol through which network devices may agree, over a public network, on a shared secret key. IKE is based on the relatively computationally burdensome Diffie-Hellman key exchange technique.

In the case of a firewall network device handling IKE sessions for many different VPNs, problems can occur during times of congestion. For example, on resumption from a power outage, hundred or thousands of failed VPN connections may simultaneously, or near simultaneously, attempt to reestablish the VPN connections. The resultant flood of IKE negotiation requests may overwhelm the firewall device, resulting in many of the requests aborting or timing out.

Accordingly, there is a need in the art to more effectively handle congestion of negotiation sessions.

SUMMARY OF THE INVENTION

One aspect consistent with the invention is directed to a method of processing sessions of a network protocol by a network device. The method includes receiving a threshold value, receiving a request for a new session of the network protocol, and determining whether to begin the new session of the network protocol based on a comparison of a number of ongoing sessions of the network protocol to the threshold value.

Another aspect consistent with the Invention is directed to a network device including an incoming request component configured to receive session requests for a negotiation session between the network device and a second network device. The network device further includes a capacity pool configured to store a value relating to capacity of the network device to continue to efficiently process the session requests and a request queue configured to queue the received session requests when the capacity pool indicates that the network device can not efficiently process the session requests.

Yet another aspect consistent with the invention is directed to a network device that includes a processor and a computer memory operatively coupled to the processor. The computer memory includes programming instructions configured to receive session requests for a negotiation session between the network device and a second network device, programming instructions configured to implement a capacity pool that stores a value relating to capacity of the network device to continue to efficiently process the negotiation sessions, and programming instructions configured to queue the received session requests when the capacity pool indicates that the network device can not efficiently process the new session requests.

Yet another aspect consistent with the invention is directed to a system including a first network device and a second network device. The second network device is coupled to the first network device via a network and initiates an IKE negotiation session with the first network device pursuant to a request to establish a VPN through the network. The second network device determines when to contact the first network device to begin the IKE negotiation session based on a current load of ongoing IKE negotiation sessions at the second network device and a threshold load value estimated as a load value at which the second network device maximizes processor usage while minimizing IKE negotiation session timeouts.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

As described herein, a network device implements congestion management by which the number of new network negotiation sessions are limited such that the total number of ongoing negotiation sessions is limited to a threshold amount that corresponds to an efficient operating capacity for the network device.

Exemplary System Overview

Figure 1:
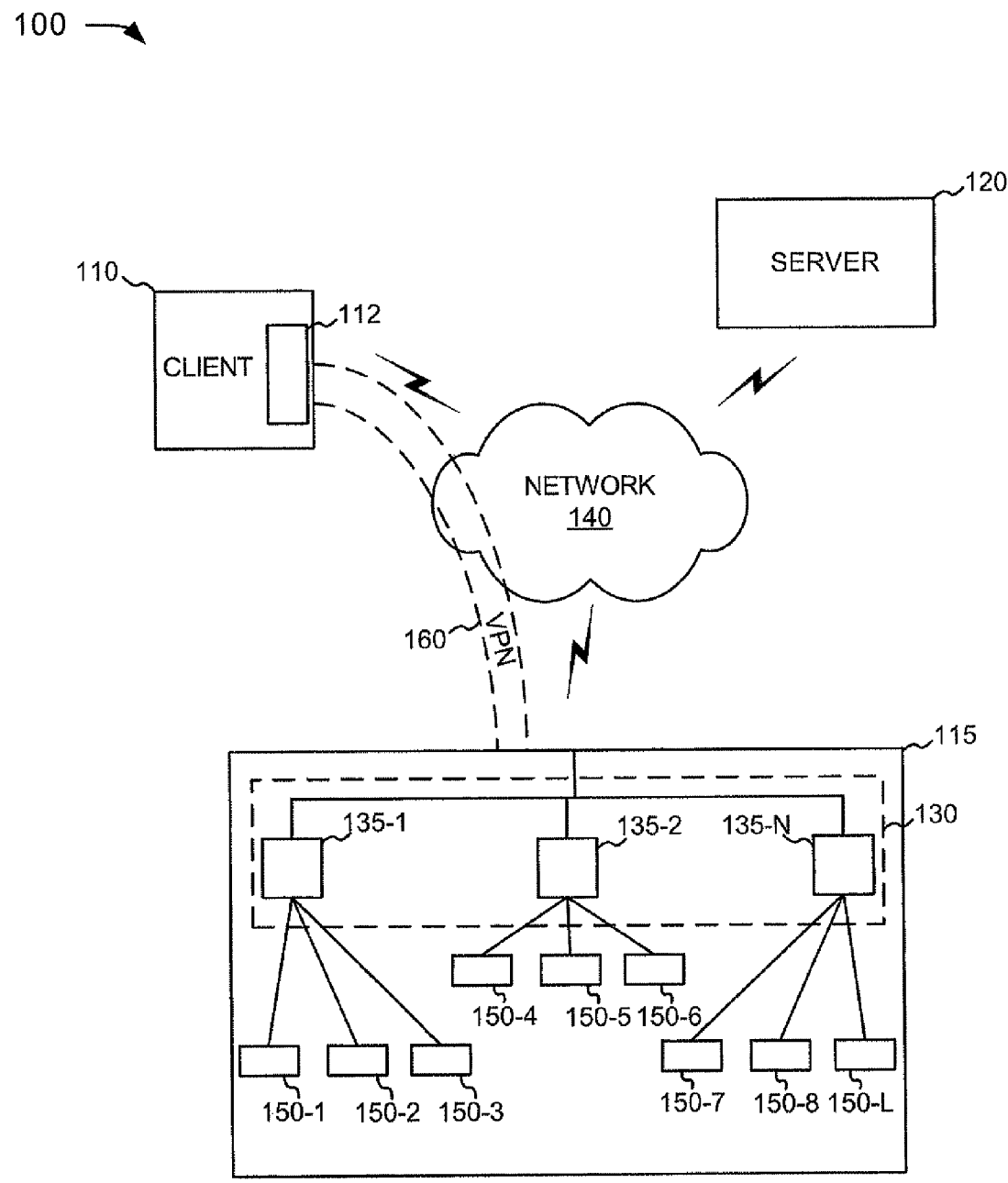
FIG. 1 is an exemplary diagram of a system in which concepts consistent with the principles of the invention may be implemented.

FIG. 1 is an exemplary diagram of a system 100 in which concepts consistent with the principles of the invention may be implemented. System 100 may include multiple entities, such as client 110, proprietary network 115 (e.g., a corporate network), and server device 120. Client 110, proprietary network 115, and server 120 may connect to one another via a network 140. Network 140 may include a local area network (LAN), a wide area network (WAN), a telephone network, such as the Public Switched Telephone Network (PSTN), an intranet, the Internet, or a combination of networks. A single client 110, proprietary network 115, and server 120 have been illustrated as connected to network 140 for simplicity. In practice, there may be more clients, servers, and/or proprietary networks.

Proprietary network 115 may be, for example, a corporate network that connects clients 150-1 to 150-L (collectively "clients 150") to network 140 via a gateway 130. A gateway can generally be thought of as a network point that acts as an entrance to another network. Gateway 130 may include a number of network devices, such as firewall devices 135-1 through 135-N (collectively "firewall devices 135"). Clients 150 of proprietary network 115 may connect to network 140 through firewall devices 135 of gateway 130.

Each of clients 110/150 may include a device such as a wireless telephone, a personal computer, a personal digital assistant (PDA), a lap top, or another type of computation or communication device, a thread or process running on one of these devices, and/or an object executable by one of these devices. Server 120 may include a server device that processes, searches, and/or maintains information and provides such information to client 110 and clients 150.

Client 110 and server 120 may additionally use network devices such as firewalls when connecting to network 140. An exemplary firewall 112 is shown for client 110. As with firewalls 135, firewall 112 may provide security features for client 110 when connecting to other devices through network 140. One such security feature that may be provided by firewalls, or other network devices, is the enablement of VPNs, such as VPN 160, via secure links that traverse network 140. Via VPN 160, client 110 may securely connect to proprietary network 115.

Exemplary Network Device Architecture

Figure 2:
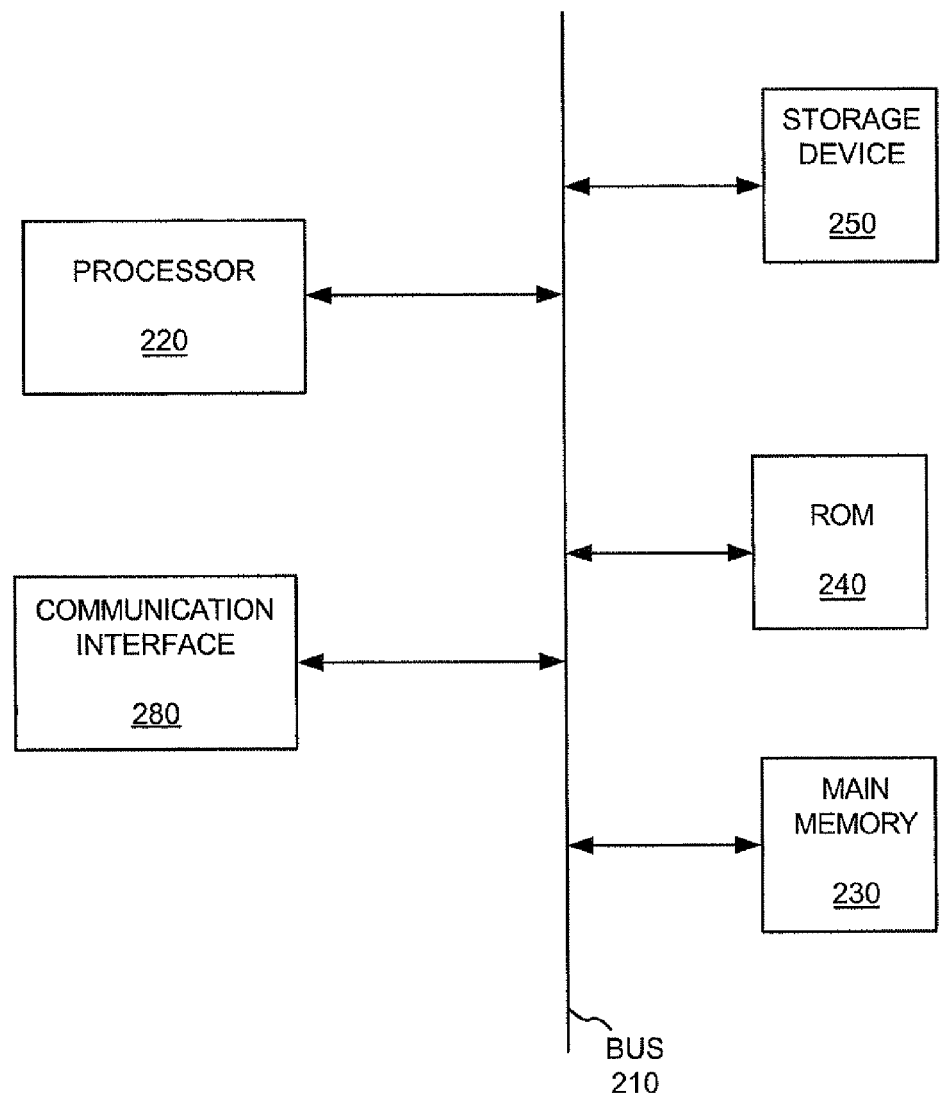
FIG. 2 is an exemplary diagram of a client, server, or another network device.

FIG. 2 is an exemplary diagram of a client 110/150, server 120, or another network device, such as a firewall 135, illustrated as computing device 200. Computing device 200 may include a bus 210, a processor 220, a main memory 230, a read only memory (ROM) 240, a storage device 250, and a communication interface 280. Bus 210 may include conductors that permit communication among the components of computing device 200.

Processor 220 may include conventional processors, microprocessors, or processing logic that interpret and execute instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Communication interface 280 may include any transceiver-like mechanism that enables computing device 200 to communicate with other devices and/or systems. For example, communication interface 280 may include mechanisms for communicating with another device or system via a network, such as network 140.

Computing device 200 may implement a number of functions, described in more detail below, using software instructions read into memory 230 from another computer-readable medium, such as data storage device 250, or from another device via communication interface 280. The software instructions contained in memory 230 may cause processor 220 to perform processes that will be described later. Alternatively, hardwired circuitry or other logic may be used in place of, or in combination with, software instructions to implement processes consistent with the invention. Thus, implementations consistent with the principles of the invention are not limited to any specific combination of hardware circuitry and software.

Figure 3:
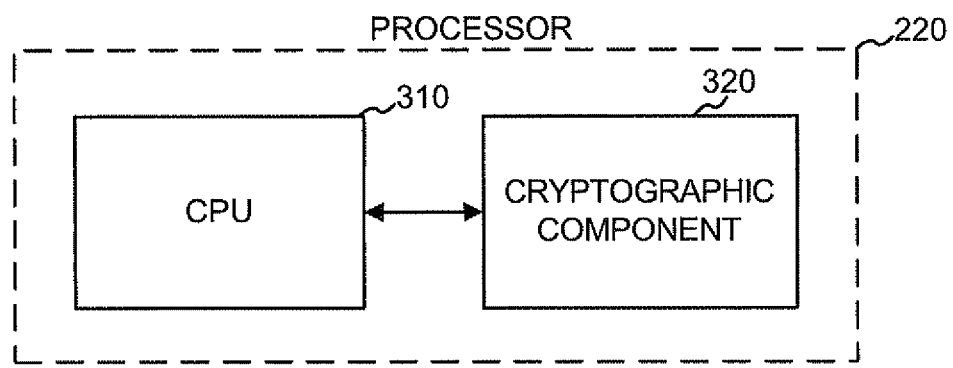
FIG. 3 is an exemplary diagram of a processor designed to handle cryptographic tasks.

FIG. 3 is an exemplary diagram of processor 220, in computing device 200, in which processor 220 is specifically designed to handle cryptographic tasks. More particularly, in this example, processor 220 includes a general purpose CPU 310 and a special-purpose cryptographic component 320. Cryptographic component 320, may be, for example, an ASIC (application specific integrated circuit) or other device designed to quickly implement cryptographic functions. In one implementation, cryptographic component 320 may be specifically designed to handle calculations used by Diffie-Hellman key exchange techniques. In operation, CPU 310 may execute programming instructions stored in memory 230 to implement most of the functions of computing device 200. CPU 310, may, however, offload Diffie-Hellman related calculations to cryptographic component 320.

Although processor 220 is shown in FIG. 3 as including a special-purpose cryptographic component 320, one of ordinary skill in the art will recognize that such a special-purpose component is not necessary. That is, Diffie-Hellman related calculations could also be performed by a general purpose processor, albeit with a likely decrease in processing speed.

IKE Negotiation Protocol

Congestion management of negotiation sessions will be described herein in the context of the IKE negotiation protocol. It can be recognized that the concepts described herein are applicable to other protocols.

Figure 4:
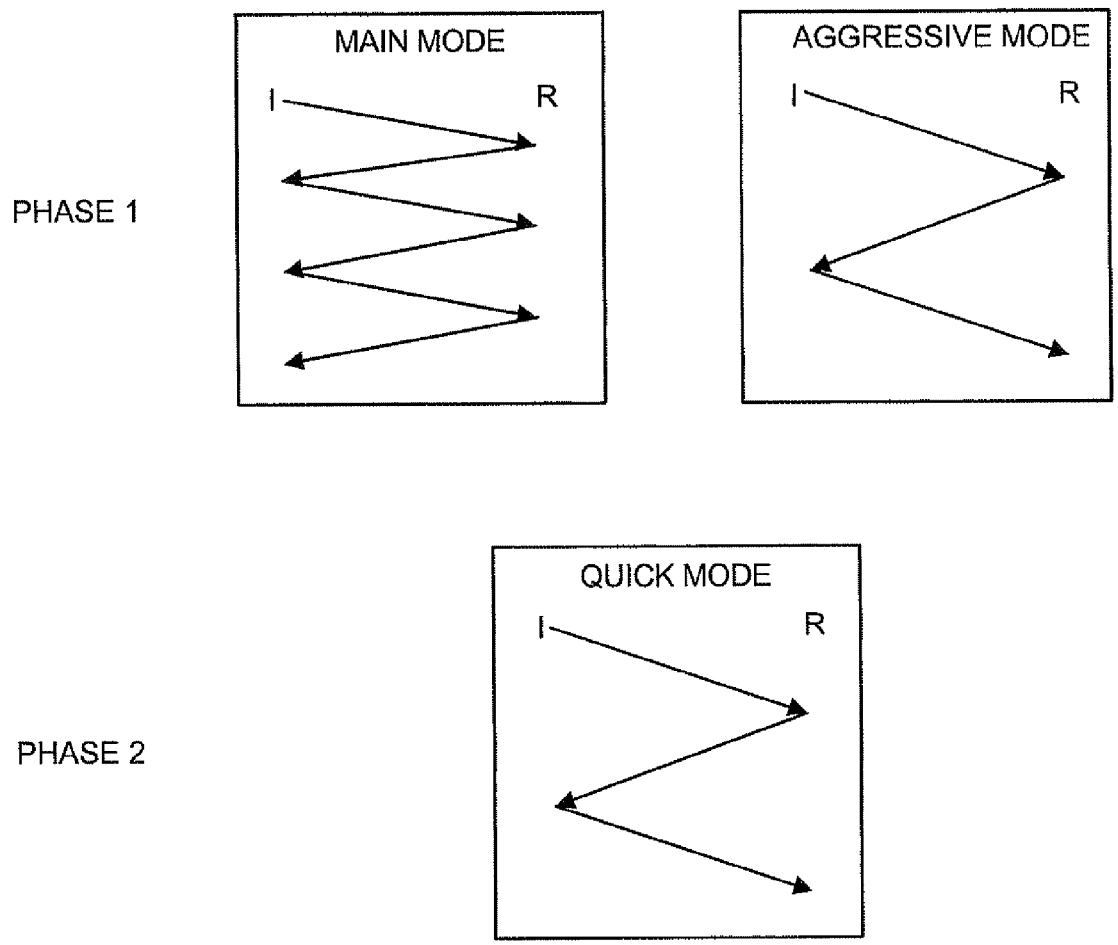
FIG. 4 is a diagram illustrating various phases that may be involved in an IKE key exchange session.

Before describing congestion management in detail, it will be helpful to review the IKE protocol. FIG. 4 is a diagram illustrating the various phases that may be involved in an IKE key exchange session. An IKE key exchange session may be a two phase negotiation. In the first phase, an initiator ("I") contacts the responder ("R") and exchanges several messages in order to obtain a "first phase key." The initiator and responder, which may correspond to two network devices (e.g., firewalls, clients, etc.), may exchange several messages to generate a "First phase key." The first phase key may be generated between the initiator and responder using one of two modes: "Main Mode" (uses six message exchanges) or "Aggressive Mode" (uses three message exchanges). In either mode, Diffie-Hellman key exchange techniques may be used, which, as previously mentioned, can be a relatively computationally burdensome calculation.

In IKE, the first phase key may be used to generate, in the second phase, the final shared symmetric key between the Initiator and responder. As with the first phase, the second phase may include the exchange of several messages between the initiator and responder.

In system 100, if too many IKE negotiations are concurrently pending, the IKE messages sent between the initiator and responder may be delayed. If a message is delayed long enough, the session may abort due to a time out error. In this situation, processing cycles and bandwidth are wasted on negotiations that do not yield any results. Accordingly, it is desirable to limit session time outs.

Congestion Management

Figure 5:
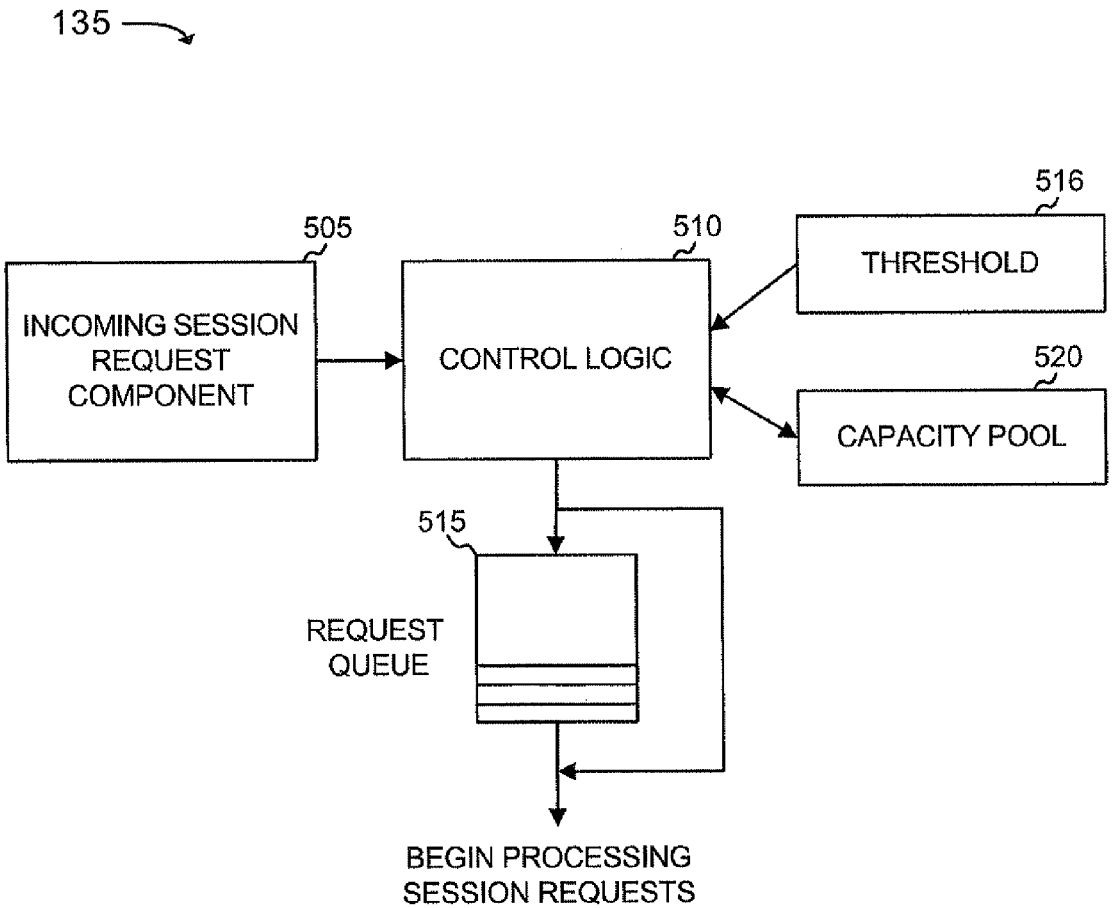
FIG. 5 is a diagram conceptually illustrating portions of a network device for managing congestion of negotiation sessions consistent with aspects of the invention.

FIG. 5 is a diagram conceptually illustrating portions of a network device, such as network device 135, for managing congestion of negotiation sessions consistent with aspects of the invention. Network device 135 may include an incoming session request component 505, control logic 510, a capacity pool 520, threshold storage element 516, and a request queue 515.

Incoming session request component 505 may generate new or handle new incoming negotiation session requests. For example, in the context of IKE negotiation sessions, network device 135 may generate requests as an initiator or receive requests as a responder. In either situation, by accepting the request and beginning the negotiation, network device 135 incurs the processing burden associated with the negotiation session.

Control logic 510 may process the negotiation session requests from incoming session request component 505 to determine whether to immediately accept the session request or whether to add the session request to request queue 515. Whether to add the session request to queue 515 may be based on the contents of capacity pool 520. When capacity pool 520 indicates the capacity of network device is above a threshold value stored in threshold storage element 516, the session request may be added to request queue 515. Otherwise, network device 135 may begin processing the session request.

Request queue 515 may be a first-in-first-out (FIFO) queue that stores session requests that control logic 510 determines are to be delayed before beginning to be processed. If request queue 515 is empty, a new session request is received, and control logic 510 determines that the new session request is to be immediately processed, request queue 515 may be bypassed. Otherwise, new session requests may be stored in request queue 515 until network device 135 is ready to process the new session requests.

Capacity pool 520 may store a value indicating the number of session requests currently being processed by network device 135. Control logic 510 may begin processing new session requests when the value is below the threshold value in threshold storage element 516. The threshold value may be based on the processing capabilities of network device 135. In one implementation, capacity pool 520 may be implemented as a counter.

The threshold value stored in threshold storage element 516 may correspond to a number of pending session requests at which network device 135 maximizes usage of processor 220 but does not overburden processor 220 to the point at which session requests are aborted due to errors, such as session time-out errors. For a particular network device 135, this threshold value may be determined empirically by generally monitoring network device 135 under load conditions and noting when network device 135 begins to experience too many negotiation timeouts.

Alternatively or additionally, the threshold value may be determined from a more theoretical basis by, for example, determining the average number of negotiation sessions that can be completed per time period (e.g., per second). From this, the average cost of a negotiation session, t, can be determined as 1/(average number of negotiation sessions completed per time period). The deadline to avoid negotiation timeouts, $T_x$, is known in advance from the protocol. Because t is very short in comparison to $T_x$, it may be assumed that t can start at any time during a negotiation. Additionally, t may be assumed to be constant for a specific platform. Consistent with an aspect of the invention, if there are a total of c−1 ongoing negotiation sessions, then the condition that should be satisfied to start a new negotiation session is: $c*t<=T_x$. In other words, to start a new session, the number of ongoing sessions plus the new session, c, should be less than the constant $T_x/t$. This value ($T_x/t$) may be set equal to the threshold value and stored in threshold storage element 516. In some implementations, a margin for error may be introduced by dividing $T_x/t$ by a constant (e.g., 1.1 for a 10% margin of error).

Figure 6:
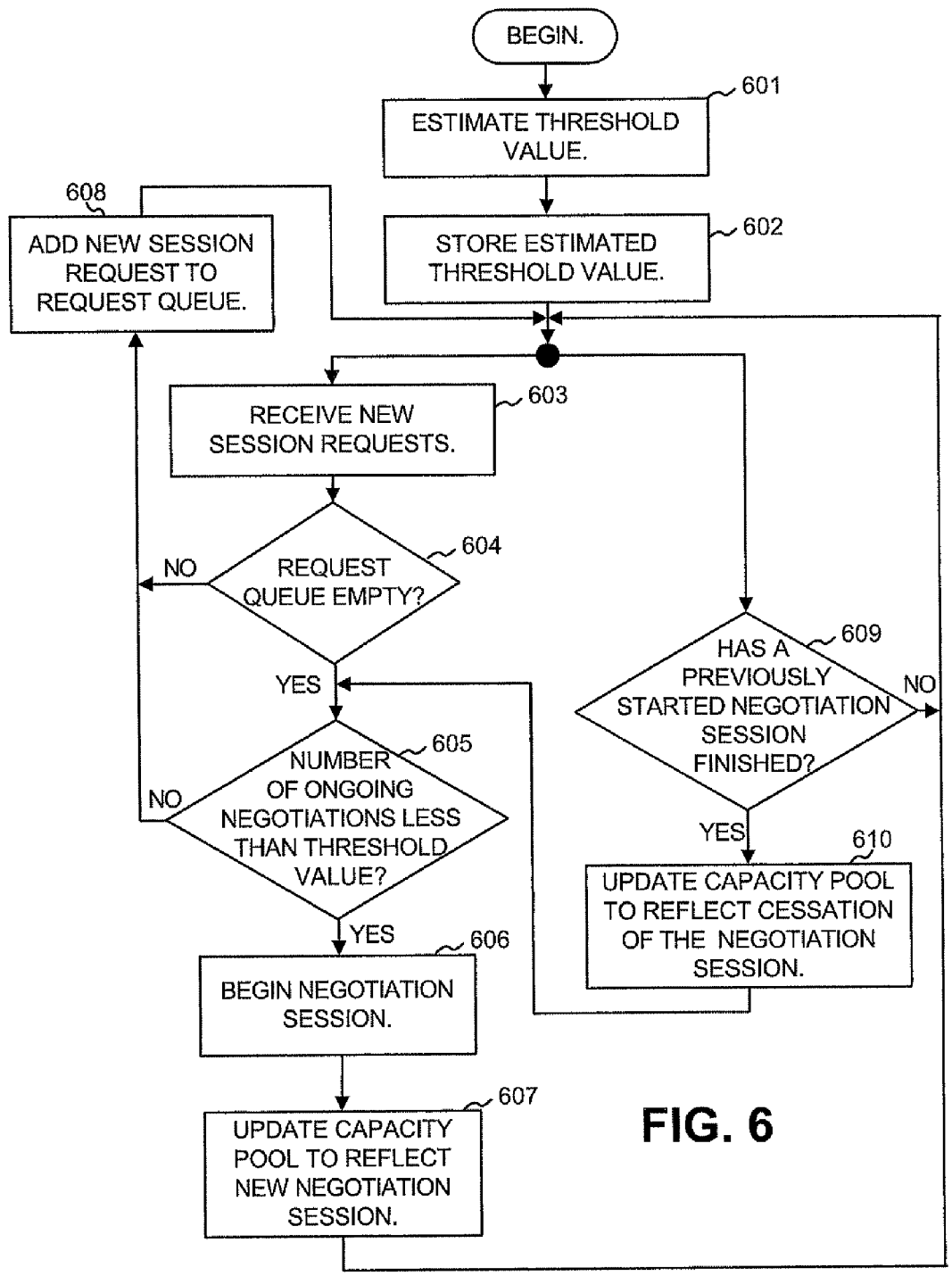
FIG. 6 is a flowchart illustrating exemplary processing consistent with aspects of the invention.

FIG. 6 is a flowchart illustrating exemplary processing consistent with aspects of the invention. Processing may begin by estimating the threshold value for a particular network device, (act 601), and then storing this value in threshold storage element 516 (act 602). As mentioned, the threshold value estimated in act 601 can be determined by, for example, empirical techniques or via a more theoretical approach.

Processing may continue during normal operation of network device 135 in acts 603-610. New session requests, such as session requests in which network device 135 is an initiator or in which network device 135 is a responder, may be received (act 603). When request queue 515 is empty and when the current number of ongoing negotiation sessions is less than the threshold value stored in threshold register 516, the session is accepted and the negotiation session may begin (acts 604, 605, and 606). Otherwise, the new session request is added to request queue 515 (acts 604, 605, 608). Returning back to act 606, when a new negotiation session begins, capacity pool 520 may be correspondingly adjusted to reflect the new ongoing negotiation session (act 607). When capacity pool 520 is implemented as a counter, capacity pool 520 may be incremented to reflect the additional ongoing negotiation session.

Negotiation sessions, after being started, will eventually finish (act 609). For example, a negotiation session may finish without errors or the negotiation session may finish due to an error condition (e.g., a timeout or other error). As the negotiation sessions finish, capacity pool 520 may be correspondingly updated to reflect that the negotiation session has finished (act 610). When capacity pool 520 is implemented as a counter, capacity pool 520 may be decremented to reflect the cessation of the negotiation session. In some implementations, capacity pool 520 may be decremented for negotiation sessions that have not officially "finished," but that are considered to be constructively finished. For example, if the large majority of negotiation sessions finish within one second, it may be beneficial to suspend a request after four seconds even if the request has not officially timed-out. Capacity pool 520 may then be decremented and the request sent back to request queue 515.

The above-described techniques for managing congestion provide for a pacing mechanism such that the number of negotiation sessions that are allowed to start are limited by the number of ongoing negotiation sessions and an estimated capacity value (i.e., the threshold value) for the network device. The estimated capacity value may be determined based on the goal of maximizing processor usage while minimizing negotiation session timeouts. Thus, even when a large number of new session requests flood the network device, the network device will not be overwhelmed.

Although the concepts discussed herein were generally described in terms of IKE negotiation sessions, these concepts could be implemented in terms of other protocol negotiations. Further, although capacity pool 520 was described as keeping track of new session requests as both initiator and responder, capacity pool 520 could, in some implementations, be used to keep track of only one of initiator or responder new session requests. Also, the concepts discussed above could be implemented at either or both of the two devices involved in a negotiation. In other words, some requests could be queued twice, one in the queue of the initiator and one in the queue of the responder.

CONCLUSION

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the invention is not limiting of the invention. Thus, the operation and behavior of the aspects were described without reference to the specific software code or hardware design—it being understood that a person of ordinary skill in the art would be able to design software and control hardware to implement the aspects based on the description herein.

The foregoing description of preferred embodiments of the invention provides illustration and description, but is not intended to be exhaustive or to limit the invention to the precise form disclosed. Modifications and variations are possible in light of the above teachings or may be acquired from practice of the invention. For example, although many of the operations described above were described in a particular order, many of the operations are amenable to being performed simultaneously or in different orders to still achieve the same or equivalent results.

No element, act, or instruction used in the present application should be construed as critical or essential to the invention unless explicitly described as such. Also, as used herein, the article "a" is intended to potentially allow for one or more items. Further, the phrase "based on" is intended to mean "based, at least in part, on" unless explicitly stated otherwise.

What is claimed:

1. A system comprising:
   a first network device coupled to a second network device via a network, the first network device to:
   receive a first request to establish a virtual private network (VPN) through the network,
   determine a quantity of Internet Key Exchange (IKE) negotiation sessions that can be completed during a particular period of time,
   determine a threshold load value based on:
   the determined quantity of IKE negotiation sessions that can be completed during the particular time period, and
   an amount of time associated with an IKE negotiation session time out,
   determine whether a second received request to establish a VPN is stored in a queue, the second request being received prior to the first request being received,
   determine, when the second request is not stored in the queue, whether a current quantity of ongoing IKE negotiation sessions at the first network device is less than the threshold load value,
   determine to bypass the queue and begin an IKE negotiation session to establish the VPN when the second request is not stored in the queue and the current quantity of ongoing IKE negotiation sessions at the first network device is less than the threshold value, and
   store, when the second request is stored in the queue or the current quantity of ongoing IKE negotiation sessions at the first network device is not less than the threshold value, the first request in the queue to delay contacting the second network device to begin the IKE negotiation session.

2. The system of claim 1, where the first network device is further to:
   contact the second network device to begin the IKE negotiation session when the second request is not stored in the queue and the current quantity of ongoing IKE negotiation sessions is less than the threshold load value.

3. The system of claim 1, where the first network device is further to:
   store a value indicating the current quantity of ongoing IKE negotiation sessions, and
   when the second request is not stored in the queue and the current quantity of ongoing IKE negotiation sessions is not greater than the threshold load value, the first network device is further to:
   bypass the queue, and
   contact the second network device to begin the IKE negotiation session.

4. The system of claim 1, where the first network device is further to:
   monitor the first network device under load conditions, where the quantity of IKE negotiation sessions that can be completed during the particular period of time is determined based on monitoring the first network device under the load conditions.

5. The system of claim 1, where the first network device is further to:
   determine an average amount of time for a duration of IKE negotiation sessions,
   where the quantity of IKE negotiation sessions that can be completed during the period of time is determined based on the determined average amount of time.

6. The system of claim 1, where, when determining the threshold load value, the first device is further to:
   multiply the quantity of IKE negotiation session that can be completed during the particular period of time by the amount of time associated with the IKE negotiation session time out to determine the threshold load value.

7. A method comprising:
   receiving, by a first network device, a first request from a second network device to establish a virtual private network (VPN) through a network;
   determining, by the first network device, a quantity of Internet Key Exchange (IKE) negotiation sessions that can be completed during a particular period of time;
   determining, by the first network device, a threshold load value based on:

the determined quantity of IKE negotiation sessions that can be completed during the particular period of time, and an amount of time associated with an IKE negotiation session time out;

determining, by the first network device, whether a second request to establish a VPN is stored in a queue, the second request being received prior to the first request being received:

determining, by the first network device and when the second request is not stored in the queue, whether a current load of ongoing IKE negotiation sessions at the first network device is less than the threshold load value;

initiating, by the first network device, the IKE negotiation session with the second network device when the second request is not stored in the queue and the current load of ongoing IKE negotiation sessions at the first network device is less than the threshold load value; and storing, by the network device, the first request in the queue when the second request is stored in the queue or the current load of ongoing IKE negotiation sessions is not less than the threshold load value.

8. The method of claim 7, further comprising:
bypassing the queue and contacting the second network device to begin the IKE negotiation session when the second request is not stored in the queue and the current load of ongoing IKE negotiation sessions is less than the threshold load value.

9. The method of claim 7, further comprising:
storing, by the first network device, a value indicating the current load of ongoing IKE negotiation sessions in a memory of the first network device, and
where initiating the IKE negotiation session includes:
bypassing, by the first network device, the queue and contacting the second network device to begin the IKE negotiation session when the second request is not stored in the queue and the value indicating the current load of ongoing IKE negotiation sessions is less than the threshold load value.

10. The method of claim 7, where initiating the IKE negotiation session includes:
bypassing the queue and immediately processing the first request to initiate the IKE negotiation session.

11. The method of claim 7, further comprising:
monitoring the first network device under load conditions, where the quantity of IKE negotiation sessions that can be completed during the particular period of time is determined based on monitoring the first network device under load conditions.

12. The method of claim 7, where the threshold load value is determined further based on an average amount of time for a duration of negotiation sessions associated with a particular network protocol.

13. The method of claim 7, where determining the threshold load value includes:
multiplying the quantity of IKE negotiation session that can be completed during the particular period of time by the amount of time associated with the IKE negotiation session time out to determine the threshold load value.

14. A method comprising:
determining, by a first network device, a quantity of Internet Key Exchange (IKE) negotiation sessions that can be completed during a particular period of time;
determining, by the first network device, a threshold value based on:
the determined quantity of IKE negotiation sessions that can be completed during the particular period of time, and
an amount of time associated with an IKE negotiation session time out;
determining, by the first network device, whether a first request to establish a first virtual private network through a network is stored in a queue of the first network device;
determining, by the first network device and when the first request is not stored in a queue of the first network device, whether to:
begin an IKE negotiation session with a second network device based on a second request to establish a second virtual private network through the network, or
delay beginning the IKE negotiation session,
determining whether to begin the IKE negotiating session or to delay beginning the IKE negotiation session being based on comparing a quantity of ongoing IKE negotiating sessions to the threshold value; and
initiating, by the first network device, the IKE negotiation session with the second network device based on determining whether to begin the IKE negotiation session or delay beginning the IKE negotiation session.

15. The method of claim 14, further comprising:
adding, by the first network device and when determining to delay the beginning of the IKE negotiation session, the second request to the queue.

16. The method of claim 15, further comprising:
bypassing, by the first network device and when determining to begin the IKE negotiation session, the queue.

17. The method of claim 14, where determining whether to begin the IKE negation session comprises:
determining, by the first network device, to begin the IKE negotiation session with the second network device when the quantity of ongoing IKE negotiating sessions is less than the threshold value.

18. The method of claim 14, where the quantity of IKE negotiating sessions that can be completed during the particular time period is determined based on monitoring the first network device under load conditions.

19. The method of claim 14, where the threshold value is determined further based on an average amount of time for a duration of negotiation sessions associated with a particular network protocol.

20. The method of claim 14, where determining the threshold value includes:
determining the threshold value prior to receiving the first request.

\* \* \* \* \*

UNITED STATES PATENT AND TRADEMARK OFFICE
CERTIFICATE OF CORRECTION

PATENT NO. : 8,478,999 B2
APPLICATION NO. : 12/550806
DATED : July 2, 2013
INVENTOR(S) : Yonghui Cheng et al.

It is certified that error appears in the above-identified patent and that said Letters Patent is hereby corrected as shown below:

In the Claims:

Column 9, claim 7, line 9 should read: "being received;"

Signed and Sealed this
Twentieth Day of August, 2013

Teresa Stanek Rea
*Acting Director of the United States Patent and Trademark Office*